Patented Aug. 29, 1939

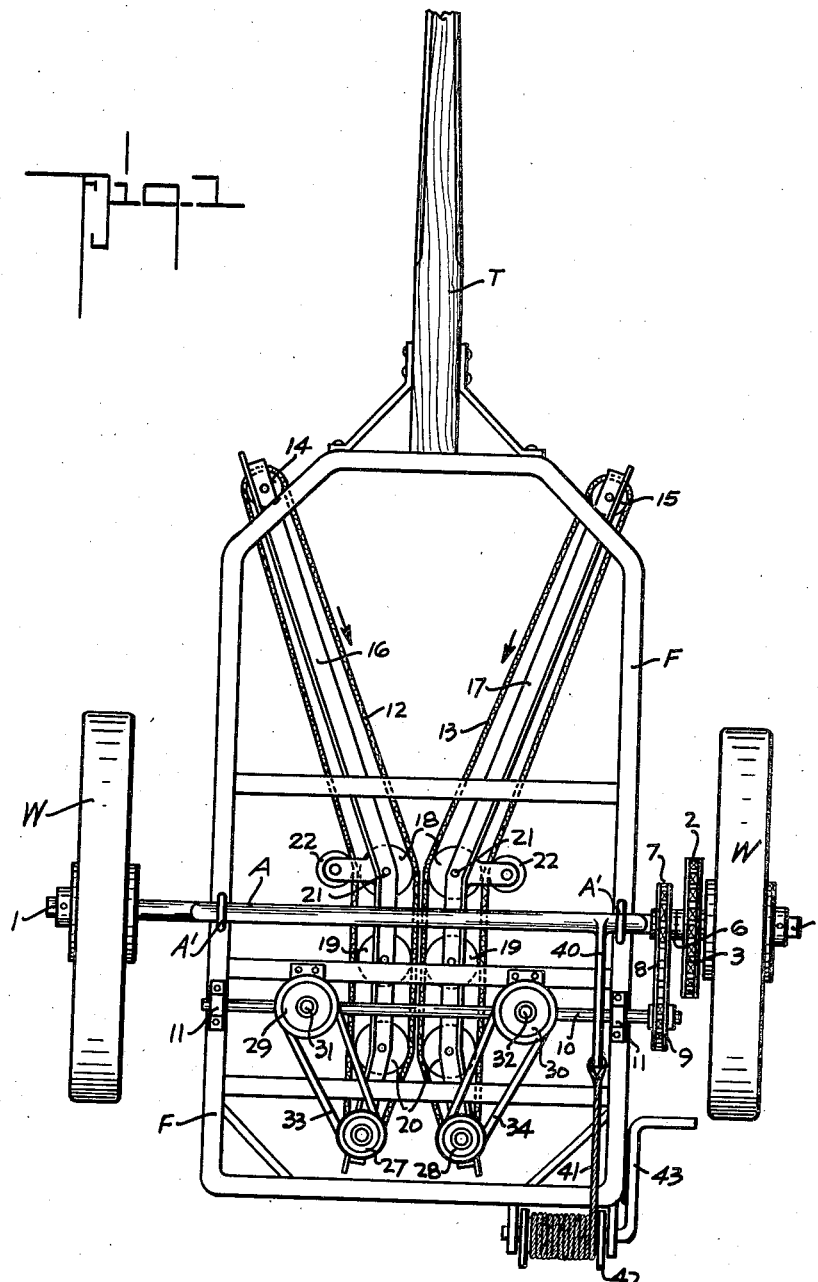

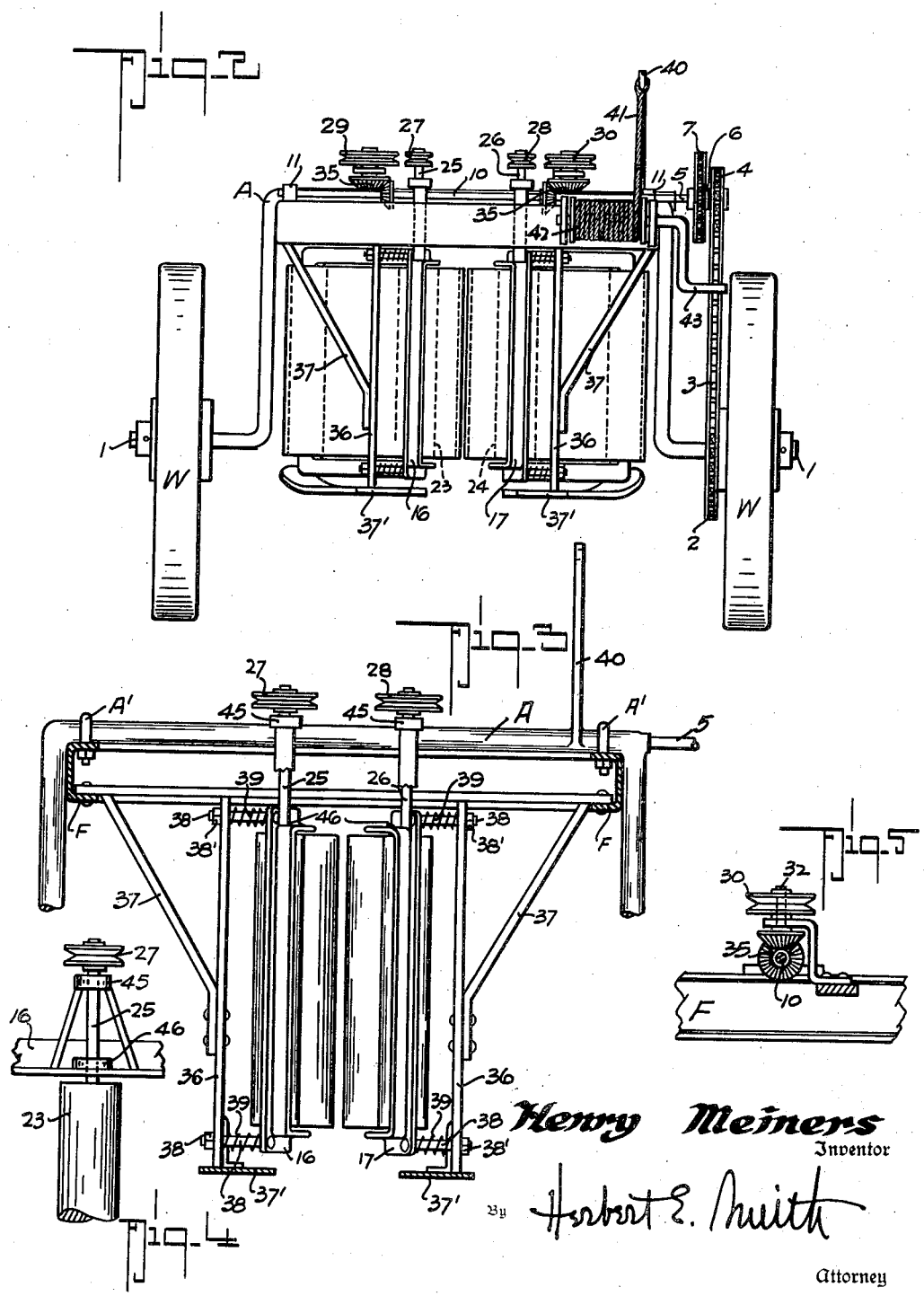

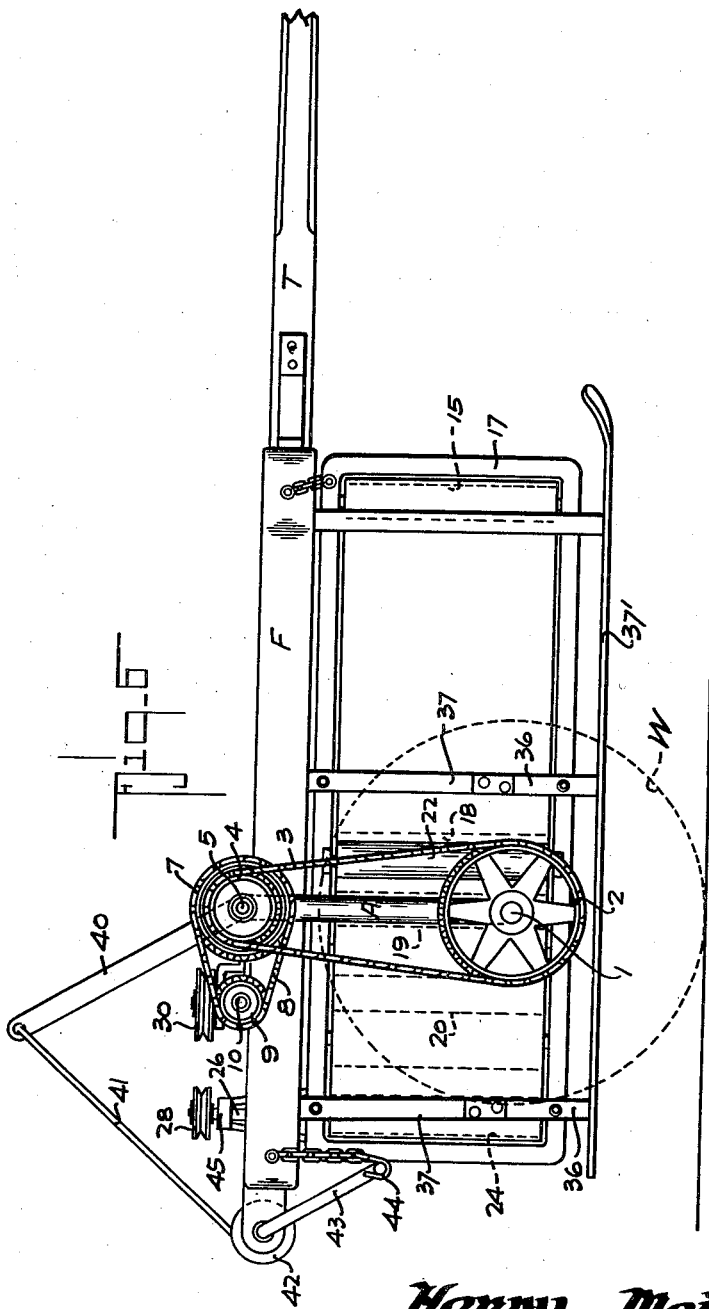

2,171,160

UNITED STATES PATENT OFFICE 2,171,160

PLANT HUSBANDRY APPARATUS

Henry Meiners, Township 14, Whitman County, Wash.

Application November 1, 1937, Serial No. 172,200

3 Claims. (Cl. 47—57)

My present invention relates to a plant husbandry apparatus involving the use of artificial means to assist in the natural generation, propagation, or reproduction of plant life in the multiplication of its kind or species. Specifically, the invention contemplates the propagation of alfalfa seeds for plant-forage crops, and other crops. As is well known the quantity of seed-yield from alfalfa crops is quite low, and therefore the seeds required for planting in preparation for a forage crop are proportionately very expensive. One of the principal factors in the low-production of seeds is the fact that alfalfa blossoms and flowers do not, under natural conditions, open sufficiently to permit access for fertilization or pollenization.

In the formation and growth of the alfalfa blossom an overhanging lip covers the top of the blossom or flower, which thereby renders the blossom comparatively inaccessible to pollen-carrying insects and pollen-laden winds, that would otherwise be fertilized by these agencies. I find that artificial means may successfully be employed for enhancing fertilization and consequent propagation, during the natural growth of the blossom and flower of the standing plant, by subjecting the blossom or flower to a harmless pressure that results in loosening or opening the blossom or flower to thereby render them more readily accessible to the pollen-carrying insects and the pollen-laden winds.

For this purpose a field of alfalfa is planted in uniformly spaced rows, and when the plants reach the blossom and flowering stages, the growing plants, including the blossoms and foliage, and later the flowers and foliage, in their standing rows, are subjected to a mechanically applied pressure, such as a squeezing action, that may be repeated, as required, at intervals. This mechanically-applied squeezing action results in loosening or opening the blossoms or flowers for fertilization of the interior parts of the blossoms or flowers, to assist in the natural generation of the alfalfa seeds.

In carrying out my invention, I have illustrated in the accompanying drawings a two-wheel, two-horse, implement, designed to travel between standing rows of alfalfa, and to straddle an intermediate row, and the implement is provided with means for mechanically imparting a laterally imposed squeezing-pressure to the plants in the intermediate row.

Figure 1 is a plan view of an implement embodying my invention.

Figure 2 is a rear elevation of the implement.

Figure 3 is a detail, transverse sectional view of the main frame of the implement, and disclosing in rear elevation the presser mechanism for applying the squeezing action to the row of plants.

Figure 4 is a detail, fragmentary view, showing a modified form of bearing for a presser-roll and its shaft.

Figure 5 is a detail view showing a bevel gear-couple and sheave employed in the power-transmission gearing for the duplicate driving rolls of the endless presser belts mounted on the implement. Figure 6 is a side elevation of the implement.

As indicated in the assembly views the implement is provided with a pair of spaced traction wheels W, W; a main frame F of channel iron and preferably rectangular in shape, to which the draft tongue T is attached in suitable manner; and a U-shape axle A supports the frame, the latter having spaced bearings A' and A' on the axle. The wheels W are journaled on the alined ends 1, 1, of the axle, and one of the wheels, at least, is employed to drive the two endless, flexible, presser-belts, through a main drive hub-sprocket-gear 2, chain 3, and another sprocket wheel 4 loose on a clutch shaft 5 which is rotatably mounted in suitable manner with relation to the elevated portion of the U-shape axle A. A clutch 6 is provided between the loose gear 4, and a second gear 7 fixed on the clutch shaft, and a rearwardly extending chain 8 passes over the gear 7 and also over a gear 9 on the countershaft 10, which countershaft also extends transversely of the main frame, from side to side, and is journaled at 11, 11, on the top of the main frame F.

The traction wheel and driving mechanism are employed to operate two vertically disposed, flexible, presser-belts 12 and 13, disposed at opposite sides of the longitudinal center of the implement, and these flexible belts of suitable material are operated from the driving gearing so that their respective outer flights travel rearward and opposite the direction of travel of the implement, at the same ground speed of the wheels W, W. The front ends of the belts diverge, as indicated in Figure 1, to push the plants laterally, from opposite sides, toward the center of the row, and the inner adjoining flights, traveling toward the rear at the same rate of speed as the outer flights, merely squeeze the row laterally, from opposite sides, without pulling or pushing the plants longitudinally of the row. The action of these two opposed presser-belts is similar to the endless track that is laid down by the well known tractor equipment or propulsion mechanism, for automotive vehicles. The foliage and blossoms, or flowers, are thus squeezed, the foliage acting as a cushion for the squeezing action or pressure, and protecting the blossoms or flowers against destruction, but at the same time permitting the blossoms or flowers to be squeezed into a loose or open condition, for the purpose described.

At the front of the main frame, the endless belts are supported by two spaced guide rolls 14 and 15, standing erect below the frame, and these rolls are journaled in the two opposed rectangular belt-frames 16 and 17 that may be made up of angle-irons, with their front portions on divergent lines to form a V-shape for gathering the plants into narrow lines, as in a row.

At the rear of the V-shaped front of the presser-mechanism are arranged three pairs of guide rolls, or opposed presser-rolls 18, 19, and 20, each having a shaft 21 journaled in the upper and lower bars of the two parallel portions of the belt-frames 16 and 17. These presser-rolls are located between the working and idle flights of the respective belts, and a pair of spaced guide rolls 22, 22, are journaled in the two frames 16 and 17, exterior of the outer idle flights of the belts, to guide these flights into parallelism with the working flights of the presser-belts.

The belts are driven through the instrumentality of two upright driving rolls 23 and 24 having shafts 25 and 26 journaled in bearings at the rear ends of the two belt-frames, and on the upper ends of these shafts, above the main frame, are mounted sheaves 27 and 28. In operative relation to these two sheaves 27 and 28, and directly over the countershaft 10 are mounted two sheaves 29 and 30 on short, upright gear shafts 31 and 32 journaled in suitable bearings on the main frame F. As indicated in Figure 1 the two sheaves 29 and 27 are connected by a belt 33, and the two sheaves 30 and 28 are connected by a similar belt 34, for transmitting power to the two driven rolls 23 and 24 of the presser-belts. The short shafts 31 and 32 take off power from the countershaft 10 through bevel gear couples as 35, 35.

The belt-frames 16 and 17, in which the two presser-belts are mounted, are supported in such manner as to provide a resilient pressure of the opposed belts against the row of alfalfa, and this resilient pressure permits the two belts to automatically adjust themselves to irregularities in the thickness or width of the row being squeezed, in order that the plants will not be damaged. It will be understood that the two parallel, opposed, working flights of the two belts, due to the advance of the implement and the rearward movement of the working flights, remain stationary with relation to the row of plants while the belts are pressing laterally against the row of plants. This lateral pressure of the belts, to squeeze the plants, is accomplished by mounting the belt-frames, with spring-backings, in upright posts 36 that are mounted in suitable number at opposite sides of the longitudinal center of the implement, and rigid with the main frame F. Diagonal braces 37 between the main frame and the posts are provided to reinforce the posts and hold them rigid. Horizontally disposed shoes or guard plates 37', 37', with front turned up ends, are also rigidly attached beneath the lower ends of the posts to assist in holding them rigid. These two longitudinally extending shoes, forming the lowest parts of the support for the presser-belts, project in advance of the presser-belts and they "ride down" any standing plants growing at the sides of the row of alfalfa. When the presser-belts are vertically adjusted to their lowest point, as will be described, these shoes are designed to glide along on the ground surface to exclude any material from the alfalfa row, and to prevent clogging of the belts.

Spring pressure is applied to the frames of the presser-belts through the use of horizontally disposed spring bars 38 and springs 39, the bars being rigidly mounted at the top and bottom portions of the belt-frames and extending loosely through holes in the posts. The springs are interposed between the posts and the presser-belt frames and coiled about the bars, and nuts 38' threaded on the bars exterior of the posts are used to vary the compression of the springs and thus vary or adjust the spring-pressure of the belts against the opposite sides of the row of plants.

For vertically adjusting the relative positions of the U-shape axle and the main frame together with the presser-belts, the axle is turned on its wheel journals 1, and it will be apparent in Figure 6 that when the axle is turned to the rear and downwardly the presser-belts will be lowered toward the ground surface. When the axle is swung from its lowered position upwardly and forwardly, the presser-belts are lifted.

This vertical adjustment of the presser-belts adapts them to varying heights of the growing alfalfa, and the adjustment may readily be accomplished by the use of a lever 40 which forms a rigid, upward extension of the U-shape axle. A cable 41 is fastened to the free end of the lever and extends rearwardly and downwardly to, and over a drum 42 that is journaled in suitable brackets rigid with the main frame F. The drum may be revolved by means of a crank 43, and a retaining chain and hook 44, anchored to the main frame, are employed for holding the parts in adjusted position.

In Figure 4 a modified form of bearings, indicated at 45 and 46, is illustrated for the driving rolls 23, 24, and their shafts 25, 26, these two bearings being spaced apart and mounted on belt-frames to insure a wide bearing-support for the shafts and their rolls.

Having thus fully described my invention, what I claim as new and desire to secure by Letters Patent is:

1. In a plant-husbandry implement, the combination with a vertically adjustable main frame and an under-frame rigid therewith, of a pair of laterally movable spring-pressed belt-frames mounted in the under-frame, a pair of opposed endless presser-belts mounted in the belt-frames and adapted to straddle a row of plants, a pair of longitudinally extending shoes having outwardly diverging front ends and mounted on the under frame beneath the presser belts, and resilient means between the under-frames and the belt-frames for applying a lateral squeezing pressure to the presser belts.

2. In a plant-husbandry implement, the combination with a vertically adjustable main frame and an under frame rigid therewith of a pair of laterally movable belt-frames having outwardly diverging front portions and mounted in the under-frame, a pair of outwardly diverging opposed endless presser-belts mounted in the belt-frames to straddle a row of plants, means for driving the belts with their adjoining working flights traveling in direction opposite to the direction of travel of the implement, and resilient means between the under-frame and the belt-frames for applying a lateral squeezing pressure to the working flights.

3. In a plant husbandry implement, the combination with a vertically adjustable main frame and an under frame rigid therewith including two sets of laterally spaced depending posts, each of said posts having upper and lower horizontal spring bars and springs thereon, and a pair of laterally movable belt frames mounted on the bars under tension of the springs, of a pair of outwardly diverging opposed endless presser belts mounted in the belt frames to straddle a row of plants, a pair of longitudinally extending shoes mounted on the lower ends of the two sets of posts, and means for driving the belts with their adjoining working flights traveling in direction opposite to the direction of travel of the implement.

HENRY MEINERS.